UNITED STATES PATENT OFFICE 2,386,980

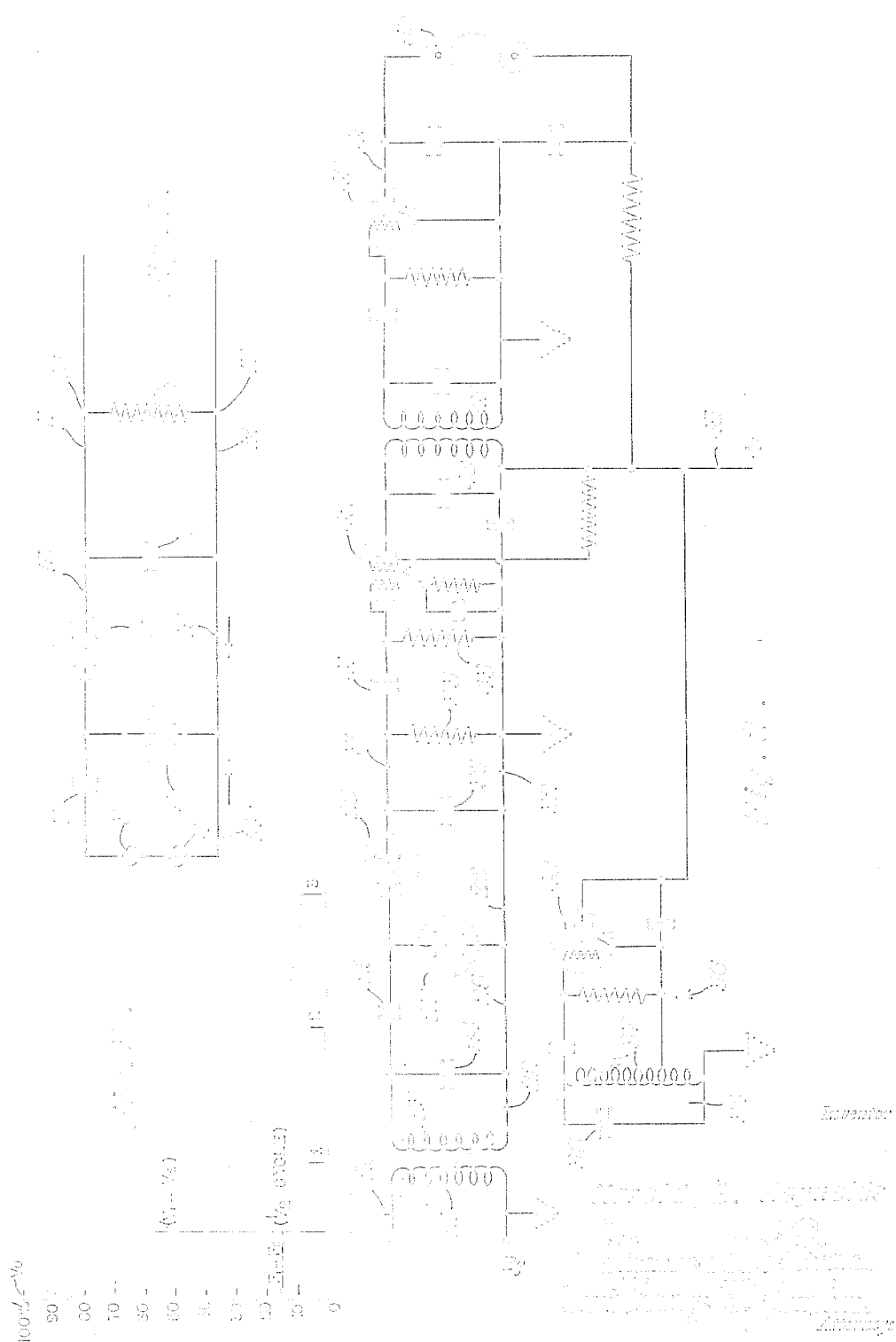

HETERODYNE RADIO SIGNAL RECEIVER

Harold B. Reynolds, Oneida, N. Y.

Application July 18, 1942, Serial No. 89,394

5 Claims. (Cl. 250—20)

This invention relates to a method and means for receiving radio signals, by means of an intermediate frequency and it has for its principal and general object to provide a new method for operating heterodyne and similar apparatus which allows a more economic utilization of the signal energy and which therefore furnishes an improved reception.

The method according to the invention consists in operating the customary detector or demodulator by means of a voltage multiplying rectifier circuit which furnishes a D. C. having approximately a multiple, for instance approximately the double of the A. C. voltage applied to it. If two different A. C. frequencies are fed to such a voltage multiplying rectifying circuit, the resulting A. C. voltage pulsates with the beat frequency corresponding to the difference between the two A. C. frequencies. If this resulting A. C. is rectified the resulting D. C. voltage pulsates or varies at the same rate between the multiples of the voltages of the two generating A. C. frequencies. This current may then be converted into an A. C. and supplied to the customary detecting or demodulating circuits or devices thus avoiding the losses due to rectification, while operating with a much higher voltage than that originally provided.

It is therefore one of the principal objects of the invention to provide a method and means of reception of radio waves by means of rectifying detectors or demodulators which avoids the loss due to the suppression of the half wave in the non-conducting direction.

It is a further object of the invention to provide a method and means for the reception of radio waves which produce a greater economy in the utilization of the signal strength.

It is a further object of the invention to provide a method and means for the reception of radio waves which operate at a much higher gain and efficiency than the customary means.

It is a further object of the invention to provide a receiving apparatus of the heterodyne type in which a voltage multiplying rectifier circuit is inserted between the circuits connected with the antenna and with the local oscillation producing the heterodyning frequency and the amplifiers, detectors or demodulators which convert the signal into audible signals.

It is a further object of the invention to provide receiving apparatus of the heterodyne type in which diode rectifiers are used, in order to produce a voltage multiplication of the A. C. currents produced by the signals and by the local oscillations and in which such diode rectifiers connected with condensers produce currents having a multiplied combined pulsating D. C. voltage, these currents being subsequently used to produce, by conversion, A. C. currents of a frequency, corresponding to the pulsation, which are then supplied to the amplifiers, detectors or demodulators of the receiving system, converting the signals into audible signals.

It is a further object of the invention to provide receiving apparatus of the heterodyne type in which diode rectifiers and condensers are combined to form voltage multiplying rectifier circuits, adapted to produce a D. C. voltage at their output ends which is a multiple of the A. C. voltage supplied at their input ends, and in which the signal frequency and a further locally produced intermediate frequency, differing from each other with respect to voltage and frequency, are fed simultaneously to the said voltage multiplying rectifier circuits, thus producing a pulsating D. C. current with a voltage varying between voltages corresponding to the multiplied voltages of the two sources of A. C. currents at a rate corresponding to the difference of the frequencies of the two sources of A. C. current.

Further more specific objects will be apparent for the following detailed specification.

The invention is illustrated diagrammatically by way of example. However it is to be understood that the example shown in the diagram is merely illustrative to serve as a base for explaining the principle of invention, and the best mode for applying the same. Modifications of the example shown are therefore not necessarily a departure from the invention.

In the drawings:

Figure 1 is a diagram illustrating a unit comprised merely of those elements which are necessary for explaining the principle of the invention.

Figure 2 is a diagram illustrating a receiver applying the principle of the invention.

Figure 3 is a diagram illustrating the condenser discharge.

The principle of the invention shall first be explained with reference to Figure 1 in which 3 and 4 are sources of A. C. with different frequencies, 5 and 6 are rectifiers, the point of the arrow indicating the direction in which the current will pass, 7 and 8 are condensers and 9 is a load on the output leads 11, 12 represented by a resistance. The circuit including rectifier 5 is designated by 14, the circuit including rectifier 6 by 15.

Let it now be first assumed that there is a single source of frequency, say 3, in the circuit 14, then upon a positive half wave for example, the current flows through the circuit 14 in the direction of the arrow and passes the rectifier 5 and the condenser 7. The condenser 7 is thereby charged. On the second half wave the current flows in the direction of the arrow near circuit 15, starting from 3, and passing condenser 7, rectifier 6 and condenser 8 and returning through the lower branches of 15, 14 to 3. Condenser 7 which had already received a charge discharges simultaneously and therefore condenser 8 is now charged with approximately double the voltage of 3. At the next cycle condenser 8 discharges itself over resistance 9, while the above described cycle starts to repeat itself. Assuming that the resistance is sufficiently high a D. C. voltage will be maintained between points 16, 17 throughout the cycle, the apex of which is around double the voltage of source 3.

Now let it be assumed that a second source of A. C. 4 is added to the circuit and let it further be assumed that the voltage furnished by the source 3 is $V_1$, while the voltage furnished by source 4 is $V_2$, $V_2$ being a fraction of $V_1$ say $$\frac{V_1}{n}$$

In this case under the assumption that both sources of current have the same frequency, the voltage will depend on the phase difference if any. If the two voltages $V_1$ and $V_2$ are in phase the D. C. voltage of the circuit will be $$2V_1\left(1+\frac{1}{n}\right)$$

at points 17 and 16. If the phases are opposed the D. C. voltage at points 17, 16 will be $$2V_1\left(1-\frac{1}{n}\right)$$

Let it now be assumed that the two frequencies of the sources 3 and 4 are slightly different, the frequency of source 3 being $F_1$ while the frequency of 4 is $F_2$. Then the condition of phase opposition and phase conjunction will be produced alternately, as the A. C. currents will produce a beat frequency $F_1-F_2$. The voltage of the D. C. currents will therefore vary as alternately phase conjunctions and phase opposition will occur at the rate of the beat frequency $F_1-F_2$.

The D. C. voltage at points 17 and 16 will therefore pulsate at the rate of the frequency $F_1-F_2$ between the values of (approximately)

$$2V_1\left(1+\frac{1}{n}\right)$$

and $$2V_1\left(1-\frac{1}{n}\right)$$

This pulsating D. C. voltage may then be again converted into an A. C. voltage of a frequency corresponding to the pulsation.

The result is therefore a conversion of the A. C. frequency in a heterodyne arrangement by means of a diode (or some equivalent detector) which does not involve the usual loss of the half wave in the detector (amounting to the half wave or around 50% of the electrical input energy) but which yields a D. C. energy with a swing between $$2V_1\left(1+\frac{1}{n}\right)$$

and $$2V_1\left(1-\frac{1}{n}\right)$$

at the rate of $F_1-F_2$. It will be clear that the conversion effect produced in this arrangement depends on two factors. One of them is the condenser discharge in a circuit-containing a non-inductive resistance which, as well known, follows an exponential or logarithmic law.

The current $i$ in such a circuit is $$i=\frac{V_0}{R}\epsilon^{-\frac{t}{CR}}$$

from which, by application of well known principles, it follows that $$V=V_0\cdot\epsilon^{-\frac{t}{CR}}$$

$V$ being the discharge voltage at the time $t$, while $V_0$ is the maximal voltage difference between the condenser plates, $\epsilon$ is the base of the Napierean logarithms and CR is the time constant.

This relationship is graphically represented in Figure 3 where the voltage is plotted against time units, the voltage being in this case marked in percent of the maximal discharge voltage at the start of the discharge.

It will be clear from the above that V has to pulsate between $V_1\pm V_2$ within ½ cycle of the beat frequency $F_1-F_2$ between the two frequencies $F_1$, $F_2$. Considering a single discharge from the initial or maximal value to the value $V_1-V_2$ when the two phases of the A. C. current are in opposition it will be clear that for best results the two frequencies $F_1$ and $F_2$ should be so chosen that V remains on the upper and steep portion of the curve. $V_1$ and $V_2$ should therefore differ to such an extent that $V_1-V_2$ is small, as a difference such as obtained by near equality of $V_1$ and $V_2$ would bring the value of $V_1-V_2$ to the lower portion of the curve where the near proportionality between voltage and time has given way to disproportionately large discharge periods for a given voltage variation.

Moreover it will also be noted that other circumstances being equal, for a given capacity in order to obtain large values of $V_1-V_2$ R (which is formed by the resistance 9) must be small. This is at variance with the requirement of the circuit arrangement explained above that a high D. C. voltage difference should be maintained at all times between the ends of the resistance.

The above explained conditions therefore require that the difference between the voltages $V_1$ and $V_2$ be small or to express it otherwise that the ratio $$\frac{V_1}{V_2}$$

should be high. The beat frequency must be chosen accordingly.

The beat frequency $F_1-F_2$ and the difference between the voltages $V_1$ and $V_2$ have to be matched with the condenser capacity so that no voltage variations following a steeper curve than the curve V will be produced for best results and full utilization of the electrical input energy. Otherwise a limiting action will take place which may even be usable in some cases for special purposes.

In the normal arrangement, however, as described above, the maximal voltage difference of the D. C. pulsation produced by the beat frequency $F_1-F_2$ between the two frequencies $F_1$ and $F_2$ is active in the output circuit and therefore influences the demodulator or detector.

Pulsations of relatively short duration, such as short pulsations occurring in the A. C. circuits with the smaller voltage, which may for instance be the signal currents will not have appreciable effect even if a slight variation of the D. C. voltage should be the result. Such a variation will be relatively small on account of the difference between the voltages $V_1$ and $V_2$, and the D. C. voltage derived at the ends of the resistance will therefore be relatively steady even if the voltage of one of the frequencies varies to a certain degree.

It will moreover be readily understood that Figure 1 shows merely an example with two rectifiers which is the most simple case. This arrangement may be expanded without difficulty so that the voltage may be tripled or quadrupled. The two A. C. sources act in the same manner on arrangements of this type, the sole difference being that the formula above given will have to be provided with a numerical factor corresponding to the multiplication factor of the voltage.

Figure 2 shows the application of the principle which has been explained above. 20 is the antenna of a radio receiver which is connected with coil 21 coupled with the oscillation circuit 22, containing coil 23 and condenser 24. The oscillation circuit is tuned to resonance with the frequency $F_1$ coming in at the antenna 20. The voltage in the circuit 22 will be a multiple of the incoming signal voltage as usual, as it is customary to step up the voltage and to realize a voltage gain in the first circuit. This oscillation circuit 22 is connected with circuits 24, 25, containing rectifiers 27, 28 of any type (such as gaseous or crystal diodes, or other rectifiers) and condensers 29, 30. Across leads 31, 32 leading from this circuit the resistance 33 is connected.

Coupled with coil 23 of circuit 22 is a tank circuit 34 of an oscillator unit 35, which comprises the oscillator tube 41, the coil 37 and condenser 38 of the tank circuit and further condensers, resistances and other elements of a well known nature which need not be described. The oscillator 35 and its circuit 34 is tuned to a frequency $F_2$ differing from the frequency $F_1$ to which circuit 22 is tuned.

It will now be easily recognized that the receiver thus far described is the exact equivalent of the unit as shown in Figure 1. The identical arrangement of the rectifiers, the condensers, the circuits and the resistance will be manifest. The two frequencies 3 and 4 are represented by the frequencies $F_1$ and $F_2$ picked up by the coil 20 from the antenna coil 21 and the oscillator tank circuit coil 37 respectively.

The resistance 33 is connected by means of a coupling condenser 41 to the I. F. amplifier 42, which may be a tetrode, the cathode of which is connected to grounded conductor 32. A grid leak resistance 43 may be connected with the control grid of the tetrode, while its second grid is used as a shield and is connected with the positive side 44 of the local source of plate current, not shown.

The plate circuit of the I. F. amplifier is connected with the I. F. transformer primary 45 which feeds the coil 47 connected with the grid of the demodulator tube 46, the plate circuit 45 of which is shown as being connected with ear phones 50. The entire circuit arrangement connected with resistance 33 is well known in the art and a more detailed description seems unnecessary, as all elements can be readily identified. It will also be understood that the circuit is shown as being without audio amplification merely in order to simplify the diagram. In most practical arrangements the usual audio amplifiers the speaker and other appliance will be used behind the demodulator.

The operation will be clear in itself, but shall be briefly recapitulated using arbitrary numerical values in order to provide a more precise information as to the performance.

Let it be assumed for instance, that a voltage of .0001 v. is picked up at the antenna 20 the frequency of the oscillation being $F_1 = 20,000$ kc. On account of the resonance tuning of the circuit 22 the voltage in this circuit will be much higher, so that a voltage of, say, .001 v. will appear across coil 23 and condenser 24. This voltage is, of course, the peak voltage of the A. C. which has been set up in circuit 22.

The oscillator 35 produces an oscillation $F_2 = 20,500$ kc. and develops a voltage of, say, 4 v.

The two frequencies corresponding to the frequencies $F_1$ and $F_2$ of the sources 3 and 4 in Figure 1 are therefore 20,000 and 20,500 kc. and the two voltages of these frequencies are .001 v. and 4 v. Therefore the A. C. voltages impressed upon the rectifier circuits are 4.001 and 3.999 v. respectively. They vary at a rate of the beat frequency of $F_1-F_2$ which is equal to 500 kc. As the D. C. voltage will be very nearly double the A. C. voltage the resulting D. C. voltages will be around 8.002 and 7.998 respectively pulsating at a rate of 500 kc. The rise and fall of the D. C. voltage when expressed in percents of the average A. C. voltage is therefore .1%.

The I. F. amplifier, demodulator etc. are therefore operated by currents having the frequency of the pulsation with a much higher gain than under operating conditions, such as those usually prevailing.

From the foregoing it will be seen that the arrangement as described permits to obtain a frequency conversion as well as a heterodyne reception, having material advantages. A particular advantage consists in the economical use of the incoming signal strength and this fact may find its expression either in an increase of the sensitivity or in a more perfect noise elimination or in an improvement in the quality of the reproduction or in other known methods utilizing increased available signal energy.

It will also be clear that the constructional features of the details are unessential and will not affect the invention as claimed.

Having described the invention, what is claimed as new is:

1. A heterodyne receiver for radio reception including intermediate frequency amplifying, and detecting means, comprising a signal circuit, a local oscillator circuit, a receiving circuit being coupled with said signal circuit and said local oscillator circuit, thus being supplied with two different frequencies, a voltage doubler arrangement for producing a direct current of double voltage connected with said receiver circuit, said voltage doubler, including two rectifiers, both connected with the receiving circuit with dissimilar electrodes giving passage to rectified currents in different directions, one of said connections containing a condenser charged by one-half wave of the alternating current and adding its discharge current to the current rectified during the following half wave, an output circuit connected with dissimilar electrodes of the two rectifiers, and a condenser and a resistance bridging said output circuit, said resistance being connected with the intermediate frequency amplifying and detecting means of the receiver, the two frequencies supplied by the receiving circuit being thus combined to produce a direct current of a voltage which is substantially double the voltage of the frequency of the local oscillator and which pulsates at the rate of the intermediate frequency.

2. A frequency conversion device comprising a voltage doubler of the type having two rectifying devices and a supply circuit connected with said rectifying devices and supplying said device with alternating currents, a condenser in one of the connections of the supply circuit with the rectifying devices, said condenser being charged through one rectifying device during the passage of one-half wave of the alternating current and discharging itself through the other of said rectifying devices during the other half wave of the alternating current, two sources of alternating current with different frequencies and different voltages in the supply circuit, producing a beat frequency, an output circuit connected with the rectifying devices, a further condenser and a resistance each of them connected across said output circuit, the two frequencies supplied by the two sources of alternating current in the supply circuit producing a fluctuating direct current of a voltage substantially the double of that of the original voltages, the fluctuations of said direct current being thus of a frequency and of a voltage different from the voltage and frequency of the sources of the alternating current.

HAROLD B. REYNOLDS.

References Cited in the file of this patent

UNITED STATES PATENTS

| Number | Name | Date |
|---|---|---|
| 1,502,063 | Schottky | July 22, 1924 |
| 1,637,404 | Bown | Aug. 2, 1927 |
| 2,151,757 | George et al. | Mar. 28, 1939 |
| 2,222,759 | Burnside | Nov. 26, 1940 |
| 2,363,288 | Bell | Nov. 21, 1944 |
| 2,383,345 | Seiler | Aug. 21, 1945 |
| 2,441,452 | Strutt et al. | May 11, 1948 |
| 2,453,078 | Posthumus | Nov. 2, 1948 |

OTHER REFERENCES

"Electronics," by J. Millman and S. Seely, 1941.

"Radar Electronics Fundamentals" Navships 900,016, Bureau of Ships, January 11, 1947, page 85.